United States Patent Office

3,433,773
Patented Mar. 18, 1969

3,433,773
NOVEL COPOLYMER
Hidehiko Kobayashi, Hiroshi Ohama, and Shizuko Saito, Tokyo, Japan, assignors to Asahi Kasei Kogyo Kabushiki Kaisha, Osaka, Japan, a corporation of Japan
No Drawing. Filed Feb. 9, 1966, Ser. No. 526,046
Claims priority, application Japan, Feb. 11, 1965, 40/7,228
U.S. Cl. 260—78.5    13 Claims
Int. Cl. C08g 17/06

ABSTRACT OF THE DISCLOSURE

A novel copolymer is produced by a method which comprises heating a hydroxy cycloacrolein acetal with a cyclic acid anhydride or polyanhydride at a temperature from room temperature to 200° C. in the presence or absence of a polymerization solvent.

---

This invention relates to novel copolymers obtained from derivatives of unsaturated aldehyde cycloacetals, particularly hydroxycycloacrolein acetal and a cyclic acid anhydride or polyanhydride and also to a method for manufacturing same.

It is known that cycloacrolein acetal derived from acrolein and a diol does not polymerize by the use of a radical polymerization catalyst such as benzoyl peroxide, azobis isobutyronitrile or the like or an anionic polymerization catalyst such as sodium alcoholate or the like. It has now been found that a hydroxycycloacrolein acetal derived from acrolein and a triol, e.g., 2-vinyl-1,3-dioxane-5-methyl-5-carbinol readily polymerizes by the use of a cationic polymerization catalyst.

It is an object of the present invention to provide novel copolymers of a hydroxycycloacrolein acetal and a cyclic acid anhydride or polyanhydride. It is another object of the present invention to provide a method for producing novel copolymers of a hydroxycycloacrolein acetal and a cyclic anhydride or polyanhydride. It is a further object of the present invention to provide novel copolymers useful as a raw material for transparent plastics.

These objects and other advantages can be obtained by the present invention.

According to the present invention, the novel copolymer is obtained by heating 1,3-dioxane or 1,3-dioxolan having one alcoholic hydroxy radical and represented by the formula of

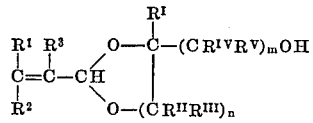

with a cyclic anhydride or polyanhydride to effect copolymerization, wherein $n$ is an integer of 1 to 2, $m$ is an integer including zero, $R^1$, $R^2$ and $R^3$ are hydrogen atoms, alkyl radicals, aryl radicals or aralkyl radicals, and $R^I$, $R^{II}$, $R^{III}$, $R^{IV}$ and $R^V$ are hydrogen atoms, alkyl radicals, alkyl radical having ester groups or halogen atoms.

According to the study of the present inventors, it has been found that the copolymerization of hydroxycycloacrolein acetal and cyclic acid anhydride does not proceed in a manner consisting of the vinyl type polymerization which results from the opening of the C to C double bond of the hydroxycycloacrolein and the ring opening polymerization type of the cyclic acid anhydride. Neither does it proceed in a ring opening copolymerization manner consisting of the ring opening polymerization type which results from the opening of cyclic acid bond of the hydroxycycloacrolein acetal and the ring opening polymerization type of the cyclic acid anhydride but rather it is caused by addition of the C—C double bond of the cycloacrolein acetal and the carboxylic acid which is produced by the addition of the alcoholic hydroxy radical of hydroxycycloacrolein acetal and the cyclic acid anhydride, and the resultant copolymer is a polyacetal ester.

The monomers represented by the above-mentioned general formula and which are used in this invention include 1,3-dioxanes or 1,3-dioxolans synthesized from acrolein, methacrolein, crotonaldehyde or the like and triols and having a carbon-carbon double bond and an alcoholic OH group, for example, 2-vinyl-1,3-dioxane-5-methyl-5-carbinol, 2-vinyl-1,3-dioxolan-4-carbinol, 2-vinyl-1,3-dioxane-5-ol, 2-propenyl-1,3-dioxane-5-methyl-5-carbinol, 2-propenyl-1,3-dioxolan-4-carbinol, 2-propenyl-1,3-dioxane-5-ol, 2-isopropenyl-1,3-dioxane-5-methyl-5-carbinol, 2-isopropenyl-1,3-dioxolan-4-carbinol, 2-isopropenyl-1,3-dioxane-5-ol. They can be used either alone or as a mixture of two or more thereof.

As the cyclic acid anhydrides there is used one or more of phthalic anhydride, succinic anhydride, maleic anhydride, itaconic anhydride, citraconic anhydride and adipic anhydride. As the polyanhydrides, one or a mixture of two or more of polyadipic anhydride, polyitaconic anhydride and polymaleic anhydride are used.

The quantitative relationship between the compound of the above-mentioned formula and the cyclic acid anhydride and the polyanhydride is that the compound of the above-mentioned formula is sometimes used in an almost equimolar quantity or greater relative to the acid anhydride group, since this copolymerization proceeds in two steps, of which the first step is the reaction of the alcoholic OH group of the monomer of the above-mentioned general formula with the acid anhydride and the polyanhydride, followed by the second step which is the reaction of the carboxylic group produced thereby with the carbon-carbon double bond of the compound of the above-mentioned general formula. When it is used in a more than equimolar quantity, the excess portion is sometimes eliminated at atmospheric or reduced pressure during the reaction or at a later stage of the reaction, as the occasion demands.

The produced copolymer has the characteristic that its copolymerization ratio is not more than 50 (mol) percent and it is substantially a regularly and alternately copolymerized polyacetal ester. When 15.8 g. of 2-vinyl-1,3-dioxane-5-methyl-5-carbinol, for example, are added to 9.8 g. of maleic anhydride and the resultant mixture is heated at 120° C., the reaction mixture became increasingly viscous with the lapse of time and a product obtained after reaction for 10 hours is solidified completely at room temperature. Further, in the infrared spectrum of the reaction product the absorption band at 1778 cm.$^{-1}$ caused by maleic anhydride is scarcely observed. When the reaction product was dissolved in dimethylformamide and the resultant solution titrated with sodium methoxide, the consumption is found to be about ¼ that before the reaction. It is understood in this connection that 1 mol of maleic anhydride is neutralized by 1 mol of sodium methoxide, while 1 mol of carboxylic group produced by reaction of maleic anhydride and alcohol is neutralized by 1 mol of sodium methoxide, so the consumption by the reaction product of sodium methoxide which is reduced to ¼ to that before the reaction means that the carboxylic groups produced in the first step have been decreased through subsequent reaction with double bonds. This is also supported by the phenomenon in the infrared spectrum of the reaction product that the absorption intensity at 1725 cm.$^{-1}$ increases with the lapse of time. In view of the above, it is clear that the copolymer is produced by an entirely novel reaction type according to this invention.

It is possible to carry out the copolymerization in the presence of an organic medium or in the absence of any medium but if the above-mentioned acid anhydride is not soluble in the compounds of the above-mentioned general formula, it is preferable to use an organic medium. As organic media, aromatic and aliphatic hydrocarbons, halogenated aromatic and aliphatic hydrocarbons, ethers and ketones, either alone or two or more of them mixed together are useful, for example, benzene, toluene, xylene, hexane, heptane, monochlorobenzene, dichlorobenzene, methylene chloride, 1,2-dichloroethane, 1,4-dichlorobutane, tetrachloroethane, ethyl ether, dioxane, tetrahydrofuran, acetone and methylethyl ketone or the like, each alone or mixed with other are favorable.

The polymerization of this invention is carried out within a temperature range of from room temperature to 200° C., preferably from 50° to 180° C. Though the polymerization time varies a little with the polymerization temperature, the reaction generally ends in 5 to 50 hours. At the end of the reaction, the resultant copolymer is a very viscous liquid or a hard and transparent solid, almost all a transparent solid at room temperature. The produced copolymer becomes soluble or insoluble in toluene and further in dimethylformamide, as the polymerization proceeds. When the polymerization proceeds to a great extent, the resultant copolymer is sometimes insoluble in dimethylformamide even at its boiling point. By heating this copolymer further at a high temperature and for a long time, insoluble and infusible hard transparent resin can be obtained. The novel copolymer thus obtained by this invention can be used as a transparent plastic material for manufacturing various molded articles.

For a clear understanding of the invention, the following specific examples are given. These examples are intended to be merely illustrative of the invention and not in limitation thereof.

Example 1

15.8 g. of 2-vinyl-1,3-dioxane-5-methyl-5-carbinol and 9.8 g. of maleic anhydride were introduced into a glass ampule. After the air in the ampule was replaced by nitrogen and the pressure reduced, the ampule was sealed and heated at 120° C. for 10 hours. The reaction product increased its viscosity gradually and after the reaction ended, it was a little viscous, and became a transparent solid at room temperature.

The infrared spectrum of the said product indicated that the absorption due to the ring of the acid anhydride had disappeared and the absorption due to the ester bond appeared intensively at 1720 cm.$^{-1}$. 100 mg. of the said product was dissolved in 40 cc. of dimethylformamide. Neutralization of the resultant solution required 15.8 cc. of a solution of 0.157 N-NaOCH$_3$ in methanol, equal to 29.6% of the consumption of the solution of NaOCH$_3$ before the reaction. This means that 70.4% of 2-vinyl-1,3-dioxane-5-methyl-5-carbinol reacted with the carboxylic groups which had been produced by the opening of the said acid anhydride. The resin was further heated at 180° C. for 3 hours and a specimen, 20 mm. long, 2 mm. wide and 1 mm. thick, was prepared from it. The flexural strength of the specimen was measured at 21° C. and found to be 6.2 kg./mm.$^2$.

Example 2

15.8 g. of 2-vinyl-1,3-dioxane-5-methyl-5-carbinol and 10 g. of succinic anhydride were introduced into a glass ampule. After the air in the ampule was replaced with nitrogen and the pressure reduced, the ampule was heated at 100° C. for 15 hours. The reaction product was a viscous liquid, a little light yellow in color, at the end of the reaction but was solidified transparent at room temperature.

The said product had a melting point of 74° C. and its infrared spectrum indicated the disappearance of the acid anhydride and the existence of the ester groups. When its solution in dimethylformamide was neutralized with CH$_3$ONa, the consumption of methoxide was 38% to that before the reaction.

After the resin was heated at 180° C. for 10 hours, the same specimen as in Example 1 was prepared from it. Its flexural strength was found to be 5.3 kg./mm.$^2$.

Example 3

15 g. of a mixture of 2-vinyl-1,3-dioxane-5-ol and 2-vinyl-1,3-dioxolan-4-carbinol and 20 g. of maleic anhydride were introduced into a glass ampule. After the pressure was reduced, it was sealed and heated at 100° C. for 20 hours. After the reaction ended, the unreacted monomer was removed at a reduced pressure of 2 mm. Hg, while the said temperature was being maintained. The product was obtained as a light yellow solid at room temperature, of which the melting point was 68° C. and the specific viscosity (1 g./100 ml., 25° C.) as measured in dimethylformamide was 0.09. When the said product was further heated at 150° C. for 14 hours, it became an insoluble and infusible hard solid. Its flexural strength measured by the same method as that of Example 1 was 9.6 kg./mm.$^2$.

Example 4

15.8 g. of 2-vinyl-1,3-dioxane-5-methyl-5-carbinol and 12.8 g. of polyadipic anhydride were introduced into a glass ampule. After the pressure was reduced, it was sealed and heated at 120° C. for 24 hours. The reaction product was dissolved in dimethylformamide. The solution was poured into water for its reprecipitation, producing 19.3 g. of a transparent solid.

The resultant product had a melting point of 82° C. and its specific viscosity (1 g./100 ml., 25° C.) as measured in dimethylformamide was 0.13. Its infrared spectrum indicated the disappearance of the acid anhydride and the existence of ester bond.

Example 5

15 g. of a mixture of 2-vinyl-1,3-dioxane-5-ol and 2-vinyl-1,3-dioxolan-4-carbinol and 20 g. of itaconic anhydride were introduced into a glass ampule. After the air in the ampule was replaced and the pressure was reduced, it was sealed and heated at 80° C. for 48 hours.

The reaction product was a transparent solid, a little light yellow in color. Its infrared spectrum indicated the existence of the ester groups and the disappearance of the acid anhydride. When a solution of the said product in dimethylformamide was neutralized with CH$_3$ONa, its consumption was 38% of that of the said mixture before the reaction.

What is claimed is:

1. A copolymer produced by heating a member selected from the group consisting of 1,3-dioxanes and 1,3-dioxolans having one alcoholic hydroxy radical and represented by the formula

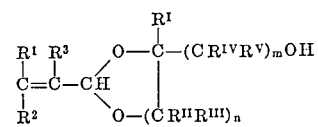

wherein $n$ is an integer of one to two, $m$ is an integer including zero, $R^1$, $R^2$ and $R^3$ are independently selected from the group consisting of hydrogen, alkyl radicals, aryl radicals and aralkyl radicals and $R^I$, $R^{II}$, $R^{III}$, $R^{IV}$ and $R^V$ are independently selected from the group consisting of hydrogen, alkyl radicals, alkyl radical having an ester radical and a halogen with a member selected from the group consisting of cyclic acid anhydrides and polyanhydrides.

2. A method for producing a copolymer of a hydroxycycloacrolein acetal and a member selected from the group consisting of cyclic acid anhydrides and polyanhydrides which comprises heating a hydroxy cycloacrolein acetal selected from the group consisting of 1,3-dioxanes and 1,3-dioxolans having one alcoholic hydroxy radical and represented by the formula

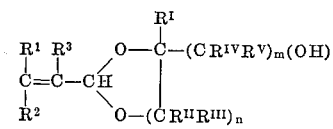

wherein $n$ is an integer of one to two, $m$ is an integer including zero, $R^1$, $R^2$ and $R^3$ are independently selected from the group consisting of hydrogen alkyl radicals, aryl radicals and aralkyl radicals and $R^I$, $R^{II}$, $R^{III}$, $R^{IV}$ and $R^V$ are independently selected from the group consisting of hydrogen, alkyl radicals, alkyl radical having an ester radical and a halogen with a member selected from the group consisting of cyclic acid anhydrides and polyanhydrides.

3. A method according to claim 2, wherein the polymerization is effected in the presence of a polymerization ture to 200° C.

4. A method according to claim 2, wherein the polymerization temperature is in the range of 50°–180° C.

5. A method according to claim 2 wherein the hydroxy cycloacrolein acetal is a 1,3-dioxane selected from the group consisting of 2-vinyl-1,3-dioxane-5-methyl-5-carbinol, 2-vinyl-1,3-dioxane-5-ol and 2-propenyl-1,3-dioxane-5-ol.

6. A method according to claim 2 wherein the hydroxy cycloacrolein acetal is a mixture of 2-vinyl-1,3-dioxane-5-ol and 2-vinyl-1,3-dioxolan-4-carbinol or a mixture of 2-propenyl-1,3-dioxane-5-ol and 2-propenyl-1,3-dioxolan-4-carbinol.

7. A method according to claim 2 wherein the hydroxy cycloacrolein acetal is a 1,3-dioxolan selected from the group consisting of 2-vinyl-1,3-dioxolan-4-carbinol and 2-propenyl-1,3-dioxolan-4-carbinol.

8. A method according to claim 2 wherein the hydroxy cycloacrolein acetal is heated with a cyclic acid anhydride.

9. A method according to claim 8 wherein the cyclic acid anhydride is maleic, phthalic, succinic, itaconic, citraconic or adipic anhydride.

10. A method according to claim 2 wherein the hydroxy cycloacrolein acetal is heated with a cyclic acid polyanhydride.

11. A method according to claim 10 wherein the cyclic acid polyanhydride is polyadipic, polyitaconic or polymaleic anhydride.

12. A method according to claim 2, wherein polymerization is effected in the presence of a polymerization solvent.

13. A method according to claim 12, wherein the polymerization solvent is an aromatic hydrocarbon, a fatty hydrocarbon, a chlorinated aromatic hydrocarbon or a chlorinated fatty hydrocarbon.

References Cited

UNITED STATES PATENTS 2,977,334  3/1961  Zopf et al. _____ 260—78.5 XR
3,373,160  3/1968  Ikeda _____ 260—88.3 XR

FOREIGN PATENTS 922,747  4/1963  Canada.

JOSEPH L. SCHOFER, Primary Examiner.
JOHN KIGHT, Assistant Examiner.

U.S. Cl. X.R.
260—88.3